United States Patent
Karipidis et al.

(10) Patent No.: US 10,391,868 B2
(45) Date of Patent: Aug. 27, 2019

(54) VEHICLE WITH AN ELECTRODYNAMIC BRAKING SYSTEM AND BRAKE RESISTOR FOR A VEHICLE

(71) Applicant: SIEMENS MOBILITY GMBH, Munich (DE)

(72) Inventors: Claus-Ulrich Karipidis, Erlangen (DE); Marcus Otto, Koenigs Wusterhausen (DE); Arnd Rueter, Krefeld (DE); Gerald Amler, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/884,602

(22) Filed: Jan. 31, 2018

(65) Prior Publication Data
US 2018/0312065 A1 Nov. 1, 2018

(30) Foreign Application Priority Data
Apr. 28, 2017 (DE) .................. 10 2017 207 274

(51) Int. Cl.
| | |
|---|---|
| *B60L 7/02* | (2006.01) |
| *B60L 7/00* | (2006.01) |
| *H01C 1/08* | (2006.01) |
| *B60L 7/22* | (2006.01) |
| *B61C 3/00* | (2006.01) |
| *B61D 17/02* | (2006.01) |
| *B61H 9/06* | (2006.01) |

(Continued)

(52) U.S. Cl.
CPC .................. *B60L 7/02* (2013.01); *B60L 7/00* (2013.01); *B60L 7/22* (2013.01); *B61C 3/00* (2013.01); *B61D 17/02* (2013.01); *B61H 9/06* (2013.01); *H01C 1/08* (2013.01); *H02P 3/14* (2013.01); *B60L 2200/26* (2013.01); *H02P 2101/40* (2015.01)

(58) Field of Classification Search
CPC ...... B60L 3/00; B60L 7/00; B60L 7/02; B60L 7/10; B60L 7/22; H01C 3/00
See application file for complete search history.

(56) References Cited

U.S. PATENT DOCUMENTS

| | | | |
|---|---|---|---|
| 7,721,855 B2 * | 5/2010 | Marsh | B60L 7/00 188/264 AA |
| 8,327,623 B2 | 12/2012 | Raman | |
| 2014/0033948 A1 | 2/2014 | Foege | |

FOREIGN PATENT DOCUMENTS

| | | |
|---|---|---|
| DE | 19828754 A1 | 12/1999 |
| DE | 102010026337 A1 | 1/2012 |

(Continued)

*Primary Examiner* — Robert J McCarry, Jr.
(74) *Attorney, Agent, or Firm* — Laurence Greenberg; Werner Stemer; Ralph Locher

(57) ABSTRACT

A vehicle, such as a rail vehicle, has an electrodynamic braking apparatus with at least one brake resistor. The at least one brake resistor forms a portion of the vehicle body shell that is permanently closed and over which air flows on the exterior, in particular, during travel of the vehicle. In the alternative, the brake resistor is arranged in the immediate vicinity of the permanently closed portion. The brake resistor conducts away heat outwardly to the environment via the permanently closed portion. There is also described a brake resistor for a vehicle, in particular for a rail vehicle, which is configured accordingly.

20 Claims, 4 Drawing Sheets

(51) Int. Cl.
*H02P 3/14* (2006.01)
*H02P 101/40* (2015.01)

(56) References Cited

FOREIGN PATENT DOCUMENTS

| | | |
|---|---|---|
| DE | 102015203689 A1 | 9/2016 |
| RU | 2195034 C2 | 12/2002 |
| RU | 168031 U1 | 1/2017 |
| WO | 2016173852 A1 | 11/2016 |

* cited by examiner

VEHICLE WITH AN ELECTRODYNAMIC BRAKING SYSTEM AND BRAKE RESISTOR FOR A VEHICLE

CROSS-REFERENCE TO RELATED APPLICATION

This application claims the priority, under 35 U.S.C. § 119, of German patent application DE 10 2017 207 274.1, filed Apr. 28, 2017; the prior application is herewith incorporated by reference in its entirety.

BACKGROUND OF THE INVENTION

Field of the Invention

A vehicle according to the invention has at least one electrodynamic braking apparatus with at least one brake resistor.

German published patent application DE 10 2015 203 689 A1 discloses a rail vehicle in which a brake resistor is pivotally mounted in the region of the vehicle outer skin and can be moved from a pivoted-in position into a pivoted-out position and vice versa. By means of the pivoting-out of the brake resistor, it can be achieved that an air stream is guided through an opening in the vehicle outer skin into the vehicle interior for cooling of, that is, heat removal from, the brake resistor.

SUMMARY OF THE INVENTION

It is accordingly an object of the invention to provide a vehicle and an associated brake resistor which overcomes the above-mentioned and other disadvantages of the heretofore-known devices and methods of this general type and which is particularly non-susceptible to faults and ensures a particularly reliable cooling of, or heat removal from, the brake resistor.

With the foregoing and other objects in view there is provided, in accordance with the invention, a vehicle, comprising:

a vehicle body shell;

at least one electrodynamic braking apparatus having at least one brake resistor;

said at least one brake resistor forming a permanently closed portion of said vehicle body shell over which air flows externally during travel of the vehicle, or said at least one brake resistor being disposed in an immediate vicinity of said permanently closed portion; and wherein heat is conducted away from said brake resistor outwardly to the surroundings via said permanently closed portion.

In other words, the above and other objects are achieved according to the invention by a vehicle having the features of, and by a brake resistor as claimed.

According to a first aspect of the invention, it is provided that the at least one brake resistor forms a portion of the vehicle body shell that is permanently closed and over which air flows externally, in particular, during travel of the vehicle, or is arranged in the immediate vicinity of such a portion and that the brake resistor conducts away heat outwardly to the surroundings via the permanently closed portion.

A primarily important advantage of the inventive vehicle lies in that the vehicle body shell is permanently closed in the region of the brake resistor, that is, it needs no mechanical drives, mechanical flaps or the like. The electrodynamic braking apparatus is therefore configured such that a heat removal or cooling of the brake resistor takes place by means of the flowing or passing airflow and/or by radiation through the portion of the vehicle body shell over which the air flows externally. In the absence of movable mechanical parts such as flaps or air deflection devices, therefore, defects in such parts can also not arise, still less a defect which could cause a failure of the braking apparatus.

According to a development of the invention, the permanently closed portion is free from mechanically movable parts for influencing an airflow or the air stream. Such mechanically movable parts are controlled and moved, for example, by means of auxiliary drives of a rail vehicle. The closed portion according to the invention is therefore free of auxiliary drives.

The permanently closed portion is preferably aerodynamically turbulence-free for the passing airflow and accordingly, in particular for example, smooth and step-free or provided with an aerodynamically effective fish scale structure. The permanently closed portion can also be configured deformation-free.

According to a further development of the first aspect of the invention, a braking energy fed during the time period of a braking, in particular, a full braking of the vehicle by means of the electrodynamic braking apparatus into the at least one brake resistor is greater than the heat conductable away during the time period of the braking via the permanently closed portion to the surroundings. Herein, a maximum time period of the braking by means of the electrodynamic braking apparatus is restricted by a maximum heat capacity of the brake resistor. Full braking should be understood herein to be a braking with the greatest braking effect.

The heat capacity of the at least one brake resistor can preferably be dimensioned, particularly in the above embodiment, such that it can absorb without destruction at least the braking energy which is fed into the brake resistor in the event of a full braking, less the heat conducted away via the permanently closed portion.

According to a further development, the heat capacity of each brake resistor is at least 50 MJ.

According to a further development, the heat removal of the at least one brake resistor by means of the permanently closed portion is always greater than the heat generated in the brake resistor in the case of a full braking. This should be independent of the starting velocity at which the full braking is initiated. Advantageously, in this embodiment, no overheating of the brake resistor(s) can occur, specifically regardless of the length and number of the braking procedures and independently of the starting velocity.

According to a further development, the closed portion of the vehicle body shell over which air stream flows externally during travel and via which the brake resistor conducts away heat outwardly to the surroundings, is dimensioned and/or configured such that the heat removal by means of convection is greater than that by means of thermal radiation, preferably at least on average over time during the time period of a full braking or at any time point.

If the vehicle is multi-membered and comprises at least one drivable car, according to a further development, each drivable car can have at least one brake resistor. The heat capacity of the brake resistor(s) arranged in the drivable cars is preferably, in each case, i.e. per brake resistor or at least in total per cars, at least 100 MJ.

If the vehicle is multi-membered and comprises at least one non-driven car, according to another further development, the at least one non-driven car can comprise at least one brake resistor which is fed with a braking current which on a braking of the vehicle is supplied from another car preferably to a drivable car or at least a car with an electrodynamic generator. The heat capacity of the brake resistor(s) arranged in the non-driven car is preferably, in each case, i.e. per brake resistor or at least in total per car, at least 100 MJ.

According to another further development, the at least one brake resistor comprises at least one electrical conductor which itself forms the permanently closed portion of the vehicle body shell or itself forms a part of the permanently closed portion of the vehicle body shell and/or is arranged in the immediate vicinity of the permanently closed portion of the vehicle body shell.

According to one embodiment, the electrical conductor has a meandering structure or a strip-shaped structure with preferably parallel conductor strips and/or forms a coil or a conductor spiral.

According to further embodiments, the electrical conductor is embedded in an electrically non-conductive material wherein the external side of the non-conductive material can form the permanently closed portion of the vehicle body shell or a part of the permanently closed portion of the vehicle body shell.

According to a further embodiment, the electrical conductor is embedded in ceramics or a composite material, in particular a ceramics-containing composite material.

According to a further development of the first aspect of the invention, the vehicle is a rail vehicle, in particular a high speed rail vehicle with a maximum velocity of at least 250 km/h.

According to a further development, the at least one brake resistor can comprise a portion made of a bimetal through which current flows during braking which deforms the permanently closed portion of the vehicle body shell on heating.

According to a second aspect of the invention, a brake resistor for a vehicle, in particular for a rail vehicle, is configured so that it forms a portion of a vehicle body shell of the vehicle that is permanently closed and over which air flows, in particular, during travel of the vehicle, or is arranged in the immediate vicinity of such a portion.

According to a further development of the second aspect of the invention, the brake resistor is electrically connected to at least one electrodynamic braking apparatus of the vehicle.

Other features which are considered as characteristic for the invention are set forth in the appended claims.

Although the invention is illustrated and described herein as embodied in vehicle and brake resistor for a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
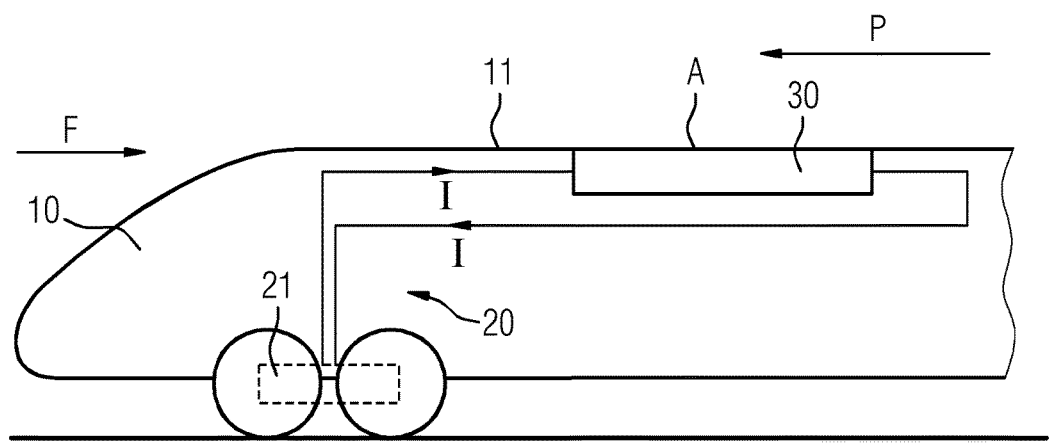
FIG. 1 is a schematic representation of an inventive rail vehicle seen from the side.

For the sake of clarity, in the drawings, the same reference signs are always used for identical or similar components.

DETAILED DESCRIPTION OF THE INVENTION

Referring now to the figures of the drawing in detail and first, particularly, to FIG. 1 thereof, there is shown a schematic side-view representation of an exemplary embodiment of a high speed rail vehicle 10. The high speed rail vehicle 10 is equipped with one or more braking apparatuses 20 each having one or more brake resistors 30.

In the exemplary embodiment of FIG. 1, the brake resistor itself forms a portion A of the vehicle body shell 11, which is permanently closed and is externally smooth and over which, during travel of the high speed rail vehicle 10, the airflow F, or air stream, flows aerodynamically turbulence-free. The permanently closed portion A of the vehicle body shell 11 is free of auxiliary drives, that is, it has no mechanically movable parts for influencing the airflow or air stream F passing the portion A or the vehicle body shell 11.

If the high speed rail vehicle 10 is braked during travel along the arrow direction P, that is, during travel from right to left in FIG. 1, by means of the braking apparatus 20, then a braking current I is fed from an electrodynamic generator 21 of the electrodynamic braking apparatus 20 into the brake resistor 30. The braking current I leads to a heating of the brake resistor 30. During the braking, therefore, kinetic energy of the vehicle is converted into electrical energy which, in turn, is converted by means of the brake resistor 30 into heat.

The heat is emitted, preferably mainly, in particular by over 90%, by convection to the airflow F flowing over the vehicle body shell 11 and thus over the portion A, or to the surrounding air. In other words, therefore, the heat emission takes place substantially by convection and direct heat transfer, and less or to only a negligible extent by the emission of thermal radiation.

In the embodiment of FIG. 1, the brake resistor 30 itself directly forms the portion A of the vehicle body shell 11 over which the airflow F flows externally. Alternatively, the brake resistor 30 can also be arranged in the immediate vicinity of a portion A of the vehicle body shell 11 over which the airflow F flows externally; such an embodiment is shown by way of example in FIG. 2. Notwithstanding the certain spacing d between the brake resistor 30 and the vehicle body shell 11, the heat can nevertheless flow away in the direction toward the vehicle body shell 11 and can be emitted there by convection to the surrounding air or the airflow F.

Figure 2:
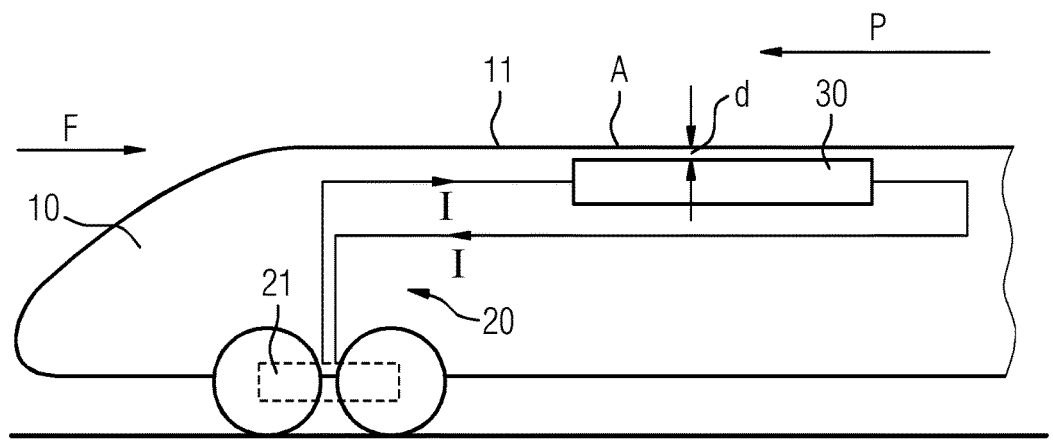
FIG. 2 is a schematic representation of a further inventive rail vehicle seen from the side.
Figure 3:
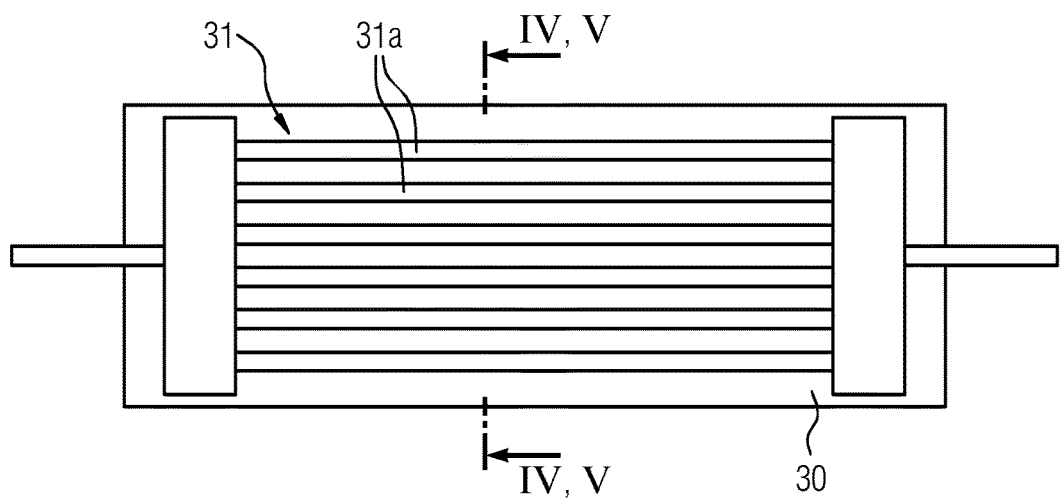
FIG. 3 is a brake resistor which can be used in the high speed rail vehicles according to FIGS. 1 and 2 and has an electrical conductor with a strip-shaped structure.

FIG. 3 shows an exemplary embodiment of a brake resistor 30 which can be used in the high speed rail vehicles 10 according to FIG. 1 or 2 in greater detail. The brake resistor 30 comprises an electrical conductor 31 which forms a strip-shaped structure with preferably parallel conductor strips 31a.

Figure 4:
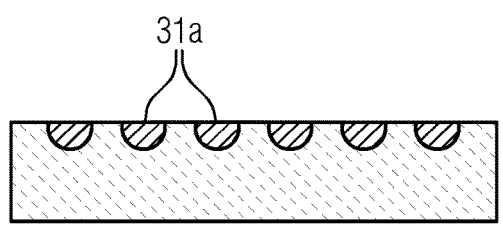
FIG. 4 is a sectional view, taken along the line IV-IV in FIG. 3, and viewed in the direction of the arrows, of the arrangement of an electrical conductor within the brake resistor.

The electrical conductor 31 can be arranged directly on the surface of the brake resistor 30 and can itself partially form the surface of the brake resistor 30 and thereby partially form the portion A of the vehicle body shell 11. Such a configuration is shown in FIG. 4.

If the brake resistor 30 is used for forming the portion A of the vehicle body shell 11, as shown in FIG. 1, the electrical conductor 31 or its conductor strips 31a themselves directly form subportions of the vehicle body shell 11.

Figure 5:
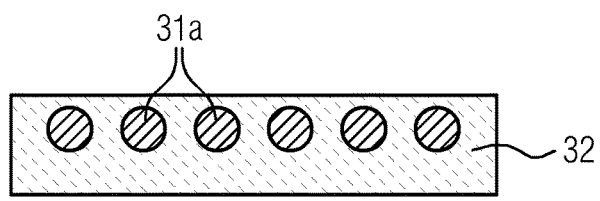
FIG. 5 is a sectional view, taken along the line V-V in FIG. 3, and viewed in the direction of the arrows, of an alternative arrangement of an electrical conductor within the brake resistor.

Alternatively, it can be provided that the electrical conductor 31 or the conductor strips 31a shown in FIG. 3 are fully embedded in a material 32 of the brake resistor 31. Such a configuration is shown in FIG. 5. The material 32 is preferably not electrically conductive or is at least less electrically conductive than the electrical conductor 31 embedded therein, but nevertheless as thermally conductive as possible. The material 32 can be a ceramics material or a composite material, for example, a ceramics-containing composite material. Such materials are very good thermal conductors and thermal accumulators despite their electrical insulating property.

Figure 6:
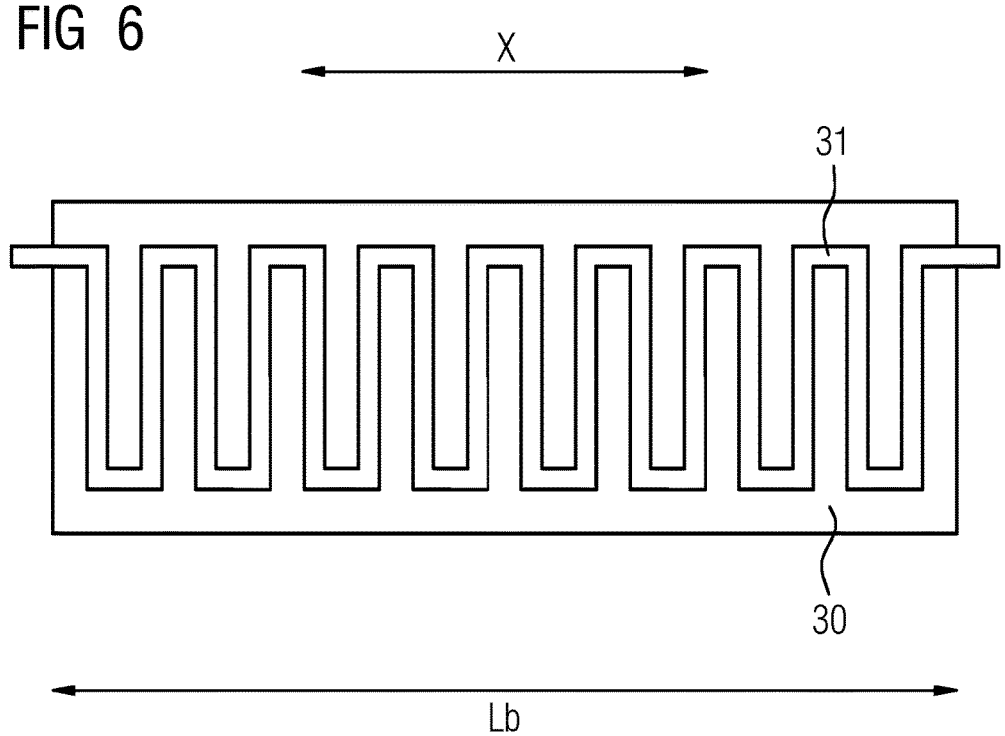
FIG. 6 is a brake resistor which can be used in the rail vehicles according to FIGS. 1 and 2 and has an electrical conductor with a meandering structure.

FIG. 6 shows an alternative embodiment of the electrical conductor 31 within the brake resistor 30. In the embodiment of FIG. 6, the electrical conductor has a meandering structure, as a result of which the conductor length of electrical conductor is significantly greater than the length Lb of the brake resistor in the vehicle longitudinal direction X.

The electrical conductor 31 can be arranged directly on the surface of the brake resistor 30, as described above in connection with FIG. 4. Alternatively, the electrical conductor can also be embedded within a material 32, as shown in FIG. 5. As described in relation to FIGS. 1 and 2, the electrical conductor 31 can itself form the vehicle body shell 11 in places or can be arranged adjacently spaced therefrom.

Figure 7:
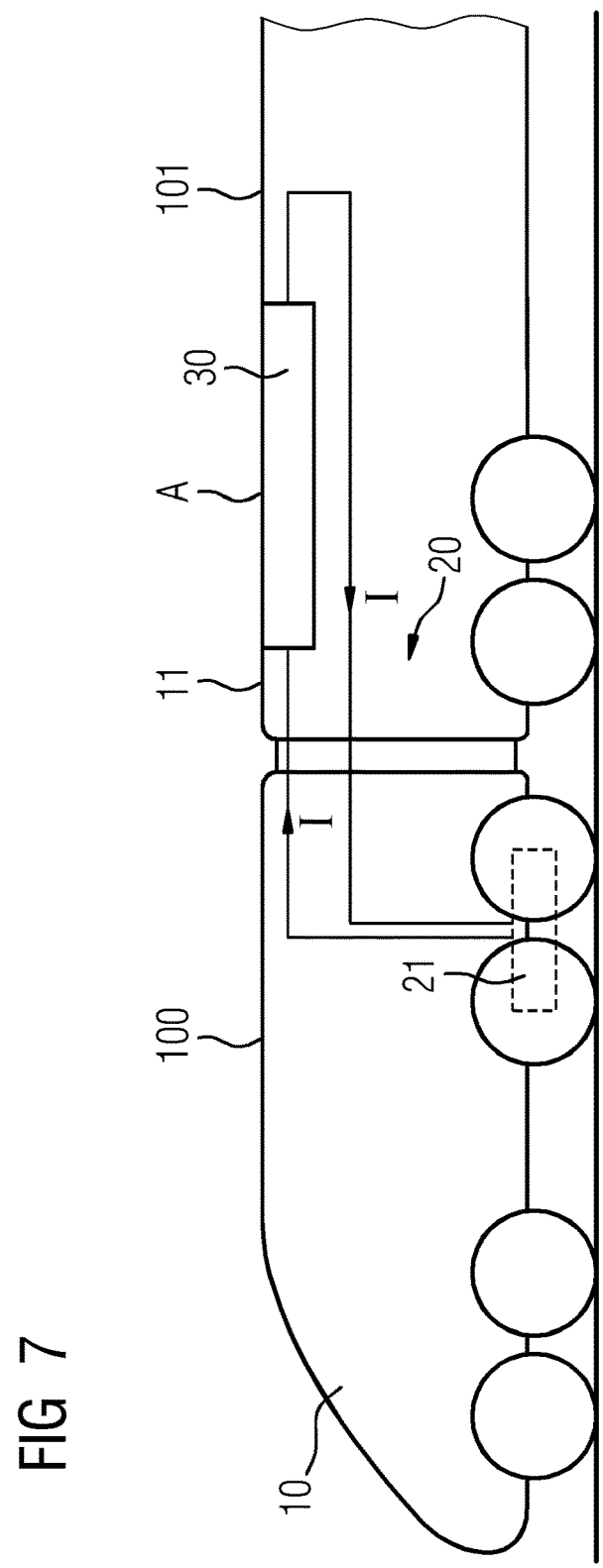
FIG. 7 is a multi-membered rail vehicle in which a brake resistor is arranged in a non-driven car.

FIG. 7 shows an exemplary embodiment of a multi-membered high speed rail vehicle 10. The high speed rail vehicle 10 has at least one driven or drivable car 100 and at least one non-driven car 101 coupled thereto. A brake resistor 30 of a braking apparatus 20 arranged across the cars is situated in the non-driven car 101 and an electrodynamic generator 21 of the electrodynamic braking apparatus 20 is situated in the driven car 100. The brake resistor 30 is supplied by the electrodynamic generator 21—in the event of a braking procedure—with a braking current I.

In the high speed rail vehicle 10, therefore, in an advantageous manner, non-driven cars are made use of for heat removal from brake resistors that are fed from driven cars. The brake resistors form a permanently closed portion A of the vehicle body shell 11 over which the airflow F flows externally during travel, or are arranged in the immediate vicinity of such a portion.

Although the invention has been illustrated and described in detail based on preferred exemplary embodiments, the invention is not restricted by the examples given and other variations can be derived therefrom by a person skilled in the art without departing from the protective scope of the invention.

The following is a summary list of reference numerals and the corresponding structure used in the above description of the invention:

10 High speed rail vehicle
11 Vehicle body shell
20 Braking apparatus
21 Generator
30 Brake resistor
31 Conductor
31a Conductor strip
32 Material
100 Car
101 Car
A Portion
d Spacing
F Airflow
I Braking current
Lb Length
P Direction of travel
X Vehicle longitudinal direction

The invention claimed is:

1. A vehicle, comprising:
a vehicle body shell;
at least one electrodynamic braking apparatus having at least one brake resistor;
said at least one brake resistor forming a permanently closed portion of said vehicle body shell over which air flows externally during travel of the vehicle, or said at least one brake resistor being disposed in an immediate vicinity of said permanently closed portion; and
wherein said permanently closed portion is free of mechanically movable parts for influencing the airflow, and heat is conducted away from said brake resistor outwardly to the surroundings via said permanently closed portion.

2. The vehicle according to claim 1, wherein a braking energy fed during a time period of a braking from said electrodynamic braking apparatus into said at least one brake resistor is greater than a heat conductable away during the time period of the braking via the permanently closed portion to the surroundings, and wherein a maximum time period of the braking by said electrodynamic braking apparatus is limited by a maximum heat capacity of said brake resistor.

3. The vehicle according to claim 2, wherein the braking energy that is greater than the heat that is conductable away is defined during a full braking of the vehicle.

4. The vehicle according to claim 1, wherein a heat capacity of said at least one brake resistor is dimensioned to enable said brake resistor to absorb without destruction at least a braking energy which is fed into said brake resistor in the event of a full braking, less the heat conducted away via said permanently closed portion during the braking.

5. The vehicle according to claim 1, wherein a heat capacity of each said at least one brake resistor is at least 50 MJ.

6. The vehicle according to claim 1, wherein a possible heat removal of said at least one brake resistor by way of said permanently closed portion at a given velocity is always greater than the heat generated in said brake resistor at the given velocity in a case of a full braking.

7. The vehicle according to claim 1, wherein said permanently closed portion of said vehicle body shell over which the air flows externally during travel and via which said at least one brake resistor conducts away heat outwardly to the surroundings is dimensioned and configured such that a heat removal by way of convection is greater than a heat removal by way of thermal radiation.

8. The vehicle according to claim 7, wherein the heat removal by way of convection is greater than the heat removal by way of thermal radiation on average over time during a time period of a full braking or at any point in time.

9. The vehicle according to claim 1, wherein:
the vehicle is a multi-membered vehicle including at least one driven car; and
said driven car comprises at least one brake resistor having a heat capacity, per brake resistor or in total for said driven car, of at least 100 MJ.

10. The vehicle according to claim 1, wherein:
said vehicle is a multi-membered vehicle including at least one non-driven car; and
said at least one non-driven car comprises at least one brake resistor having a heat capacity, per brake resistor or in total for said non-driven car of at least 100 MJ; and
said at least one brake resistor of said at least one non-driven car is fed with a braking current generated and supplied, upon braking, from a driven car of said multi-membered vehicle.

11. The vehicle according to claim 1, wherein said at least one brake resistor comprises at least one electrical conductor, said at least one electrical conductor:
itself forming said permanently closed portion of said vehicle body shell or itself forming a part of said permanently closed portion of said vehicle body shell; and/or being disposed in an immediate vicinity of said permanently closed portion of said vehicle body shell.

12. The vehicle according to claim 11, wherein said electrical conductor has a shape selected from the following: a meandering structure, a strip-shaped structure with conductor strips, a coil and a conductor spiral.

13. The vehicle according to claim 11, wherein said electrical conductor is embedded in an electrically non-conductive material.

14. The vehicle according to claim 13, wherein an exterior side of said non-conductive material forms said permanently closed portion of said vehicle body shell or a part of said permanently closed portion of said vehicle body shell.

15. The vehicle according to claim 11, wherein said electrical conductor is embedded in a ceramics-containing composite material.

16. The vehicle according to claim 1, wherein the vehicle is a high speed rail vehicle configured for maximum speeds of at least 250 km/h.

17. The vehicle according to claim 1, wherein said at least one brake resistor comprises a portion made of a bimetal through which current flows during braking, causing a deformation of said permanently closed portion of said vehicle body shell on heating.

18. A brake resistor for a vehicle, the brake resistor forming a portion of a vehicle body shell that is permanently closed and over which air flows during a relative movement of the vehicle, or the brake resistor being disposed in an immediate vicinity of the portion of the vehicle body shell that is permanently closed, and wherein said permanently closed portion is free of mechanically movable parts for influencing the airflow.

19. The brake resistor according to claim 18, wherein the brake resistor is electrically connected to an electrodynamic braking apparatus of the vehicle.

20. A vehicle, comprising:
a vehicle body shell;
at least one electrodynamic braking apparatus having at least one brake resistor;
said at least one brake resistor forming a permanently closed portion of said vehicle body shell over which air flows externally during travel of the vehicle, or said at least one brake resistor being disposed in an immediate vicinity of said permanently closed portion;
wherein heat is conducted away from said brake resistor outwardly to the surroundings via said permanently closed portion; and
wherein a braking energy fed during a time period of a braking from said electrodynamic braking apparatus into said at least one brake resistor is greater than a heat conductable away during the time period of the braking via the permanently closed portion to the surroundings, and wherein a maximum time period of the braking by said electrodynamic braking apparatus is limited by a maximum heat capacity of said brake resistor.

* * * * *